(12) United States Patent
Lee et al.

(10) Patent No.: US 12,545,974 B2
(45) Date of Patent: Feb. 10, 2026

(54) METHOD FOR RECOVERING ACTIVE METAL OF LITHIUM SECONDARY BATTERY

(71) Applicant: SK INNOVATION CO., LTD., Seoul (KR)

(72) Inventors: Hyeon Hui Lee, Daejeon (KR); Ji Yun Park, Daejeon (KR); Young Bin Seo, Daejeon (KR); Seung Ok Lee, Daejeon (KR); Sung Real Son, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 477 days.

(21) Appl. No.: 18/010,576

(22) PCT Filed: May 31, 2021

(86) PCT No.: PCT/KR2021/006733
§ 371 (c)(1),
(2) Date: Dec. 15, 2022

(87) PCT Pub. No.: WO2021/256732
PCT Pub. Date: Dec. 23, 2021

(65) Prior Publication Data
US 2023/0250507 A1 Aug. 10, 2023

(30) Foreign Application Priority Data
Jun. 18, 2020 (KR) .......................... 10-2020-0074235

(51) Int. Cl.
*C22B 3/08* (2006.01)
*B01D 61/42* (2006.01)
(Continued)

(52) U.S. Cl.
CPC .............. *C22B 3/08* (2013.01); *B01D 61/423* (2022.08); *C01D 15/02* (2013.01); *C22B 3/045* (2013.01);
(Continued)

(58) Field of Classification Search
CPC ......... C22B 3/08; C22B 3/045; C22B 23/043; C22B 26/12; C22B 47/00; C22B 3/22;
(Continued)

(56) References Cited

U.S. PATENT DOCUMENTS

2013/0192425 A1 8/2013 Sonu et al.

FOREIGN PATENT DOCUMENTS

| CN | 108069447 A | * | 5/2018 | ............. C01D 15/02 |
| CN | 108517409 A | | 9/2018 | |

(Continued)

OTHER PUBLICATIONS

CN-108069447-A Translation (Year: 2018).*
(Continued)

*Primary Examiner* — Danielle M. Carda
(74) *Attorney, Agent, or Firm* — The PL Law Group, PLLC

(57) ABSTRACT

In a method for recovering an active metal of a lithium secondary battery, a sulfuric acid solution is added to a lithium metal composite oxide so as to prepare a sulfated active material solution. A transition metal is extracted from the sulfated active material solution. A lithium precursor is recovered by adding a lithium extracting agent to the solution remaining after the transition metal has been extracted from the sulfated active material solution. In the method, the amount of impurities is reduced, and sulfuric acid and the neutralizing agent can be recycled so that a high-yield lithium precursor recovery is enabled.

16 Claims, 3 Drawing Sheets

(51) Int. Cl.
*C01D 15/02* (2006.01)
*C22B 3/00* (2006.01)
*C22B 3/04* (2006.01)
*C22B 26/12* (2006.01)
*C22B 47/00* (2006.01)
*H01M 10/54* (2006.01)

(52) U.S. Cl.
CPC ............ *C22B 23/043* (2013.01); *C22B 26/12* (2013.01); *C22B 47/00* (2013.01); *H01M 10/54* (2013.01)

(58) Field of Classification Search
CPC ......... C22B 3/32; C22B 3/326; C22B 3/3842; C22B 3/3844; C22B 3/3846; C22B 3/44; C22B 7/001; C22B 7/005; C22B 23/0461; C22B 23/04; B01D 61/423; B01D 61/422; C01D 15/02; C01D 15/06; H01M 10/54; C01G 1/10; C01G 45/10; C01G 51/10; C01G 53/10; Y02P 10/20; Y02W 30/84
USPC .......................................................... 75/743
See application file for complete search history.

(56) References Cited

FOREIGN PATENT DOCUMENTS

| CN | 110475879 A | 11/2019 | |
|---|---|---|---|
| EP | 3604567 A1 * | 2/2020 | ............... B09B 3/00 |
| JP | 2009-270189 A | 11/2009 | |
| JP | 4892925 B2 | 3/2012 | |
| JP | 2013-181203 A | 9/2013 | |
| JP | 2016-500754 A | 1/2016 | |
| JP | 2018-168456 A | 11/2018 | |
| JP | 2019-530795 A | 10/2019 | |
| KR | 10-2011-0060089 A | 6/2011 | |
| KR | 10-2015-0063159 A | 6/2015 | |
| KR | 10-1674393 B1 | 11/2016 | |
| KR | 10-2020238 B1 | 9/2019 | |
| KR | 10-2020-0036625 A | 4/2020 | |
| WO | WO 2007/129845 A1 | 11/2007 | |
| WO | WO 2018/181816 A1 | 10/2018 | |
| WO | WO-2019100159 A1 * | 5/2019 | ............ B01D 61/42 |

OTHER PUBLICATIONS

European Search Report for EP 21827064.3 issued on Aug. 21, 2023 from European patent office in a counterpart European patent application.
Choubey Pankaj K et al., "Advance review on the exploitation of the prominent energy-storage element Lithium. Part II:From sea water and spent lithium ion batteries (LIBs)", Minerals Engineering, vol. 110, Apr. 28, 2017, pp. 104-121, XP085044519, ISSN: 0892-6875, DOI: 10.1016/J.MINENG.2017.04.008.
International Search Report for PCT/KR2021/006733 mailed on Aug. 25, 2021.
Communication pursuant to Article 94(3) EPC issued on Nov. 25, 2024 from European Patent Office in a counterpart European Patent Application No. 21827064.3.
Zhang Xiaoxiao et al., "Toward sustainable and systematic recycling of spent rechargeable batteries", Chemical Society Reviews, vol. 47, No. 19, 2018 , pp. 7239-7302, XP093225961, UK ISSN: 0306-0012, DOI: 10.1039/C8CS00297E.
Office action issued on Apr. 8, 2025 from Korean Patent Office in a counterpart Korean Patent Application No. 10-2020-0074235 (all the cited references are listed in this IDS.) (English translation is also submitted herewith.).
Office action issued on Jun. 3, 2025 from Japan Intellectual Property Office in a counterpart Japanese Patent Application No. 2022-577360 (all the cited references are listed in this IDS.) (English translation is also submitted herewith. ).

* cited by examiner

METHOD FOR RECOVERING ACTIVE METAL OF LITHIUM SECONDARY BATTERY

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/006733, filed May 31, 2021, which claims priority to the benefit of Korean Patent Application No. 10-2020-0074235 filed in the Korean Intellectual Property Office on Jun. 18, 2020, the entire contents of which are incorporated herein by reference.

BACKGROUND

1. Technical Field

The present invention relates to a method for recovering an active metal of a lithium secondary battery. More particularly, the present invention relates to a method for recovering an active metal of a lithium secondary battery utilizing an acidic solution and a basic solution.

2. Background Art

Recently, a secondary battery has been widely employed as a power source of a mobile electronic device such as a camcorder, a mobile phone, a laptop computer, etc., and a vehicle such as an electric vehicle, a hybrid vehicle, etc. A lithium secondary battery is highlighted among the secondary battery due to advantages such as high operational voltage and energy density per unit weight, a high charging rate, a compact dimension, etc.

A lithium metal oxide may be used as an active material for a cathode of the lithium secondary battery. The lithium metal oxide may further contain a transition metal such as nickel, cobalt, manganese, etc.

As the above-mentioned high-cost valuable metals are used for the cathode active material, 20% or more of a production manufacturing cost is required for manufacturing the cathode material. Additionally, as environment protection issues have recently been highlighted, a recycling method of the cathode active material is being researched.

For example, a method of sequentially recovering the valuable metals by leaching a waste cathode active material in a strong acid has been used. However, the wet process may be disadvantageous in aspect of a regeneration selectivity due to by-products caused by a solution-based reaction. Further, a large amount of the solution is used to degrade a process efficiency and a lithium recovery ratio, and thus sufficient recycle properties may not be provided.

For example, Korean Registered Patent Publication No. 10-0709268 discloses an apparatus and a method for recycling a waste manganese battery and an alkaline battery.

SUMMARY

According to an aspect of the present invention, there is provided a method of recovering an active metal of a lithium secondary battery with improved reaction efficiency and process reliability.

In a method for recovering an active metal of a lithium secondary battery according to embodiments of the present invention, sulfuric acid is added to a lithium metal composite oxide to prepare a sulfated active material solution. A transition metal is extracted from the sulfated active material solution. A lithium extracting agent is added to a residual solution in which the transition metal is extracted from the sulfated active material solution to recover a lithium precursor.

In some embodiments, a transition metal extracting agent that includes an alkyl phosphate-based compound, an alkyl phosphonic acid-based compound, an alkyl phosphinic acid-based compound or a carboxylic acid-based compound may be added into the sulfated active material solution to extract the transition metal.

In some embodiments, the lithium metal composite oxide may contain nickel, cobalt and manganese. A pH of the sulfated active material solution may be sequentially increased to sequentially extract manganese, cobalt and nickel.

In some embodiments, the lithium metal composite oxide may contain nickel, cobalt, and manganese, and nickel, cobalt, and manganese may be simultaneously extracted.

In some embodiments, the lithium extracting agent may include an alkyl phosphinic acid-based compound, an alkyl phosphonic acid-based compound or a carboxylic acid-based compound.

In some embodiments, the transition metal extracting agent and the lithium extracting agent may be added in a saponified state by an alkali metal hydroxide.

In some embodiments, an alkali metal sulfate and lithium sulfate may be generated from the residual solution by adding the lithium extracting agent.

In some embodiments, the alkali metal sulfate generated from the residual solution may be converted into a sulfuric acid solution and an alkali metal hydroxide.

In some embodiments, the converted alkali metal hydroxide may be recycled to a saponification of the transition metal extracting agent and the lithium extracting agent.

In some embodiments, the converted sulfuric acid solution may be recycled to the preparation of the sulfated active material solution or the extraction of the transition metal from the sulfated active material solution.

In some embodiments, the conversion of the alkali metal sulfate generated from the residual solution into the sulfuric acid solution and the alkali metal hydroxide may be performed by an electrodialysis.

In some embodiments, the lithium extracting agent is added to the residual solution to generate lithium sulfate. The recovering of lithium precursor may include converting the generated lithium sulfate into lithium hydroxide by an electrodialysis.

In some embodiments, a sulfuric acid solution may be generated together with lithium hydroxide by the electrodialysis.

In some embodiments, the sulfuric acid solution may be recycled to the preparation of the sulfated active material solution or the extraction of the transition metal from the sulfated active material solution.

In a method for recovering an active metal of a lithium secondary battery according to embodiments of the present invention, sulfuric acid is added to a lithium metal composite oxide to prepare a sulfated active material solution. A transition metal is extracted from the sulfated active material solution. Lithium hydroxide is recovered directly from a residual solution from which the transition metal is extracted from the sulfated active material solution by an electrodialysis.

In some embodiments, the recovering lithium hydroxide includes converting lithium sulfate contained in the residual solution into lithium hydroxide by the electrodialysis.

In some embodiments, a sulfuric acid solution may be recycled to the preparation of the sulfated active material solution or the extraction of the transition metal from the sulfated active material solution. Sulfuric acid solution may be generated from lithium sulfate by the electrodialysis.

In some embodiments, a transition metal extracting agent that includes an alkyl phosphate-based compound, an alkyl phosphonic acid-based compound, an alkyl phosphinic acid-based compound or a carboxylic acid-based compound may be added into the sulfated active material solution to extract the transition metal.

In some embodiments, the lithium metal composite oxide may contain nickel, cobalt and manganese. A pH of the sulfated active material solution may be sequentially increased to sequentially extract manganese, cobalt and nickel.

In some embodiments, the lithium metal composite oxide may contain nickel, cobalt, and manganese, and nickel, cobalt, and manganese may be simultaneously extracted.

In some embodiments, a portion of the recovered lithium hydroxide may be recycled for a saponification of the transition metal extracting agent.

In some embodiments, in the preparation of the sulfated active material solution, hydrogen peroxide may be added together with sulfuric acid.

According to the exemplary embodiments described above, nickel, manganese and cobalt may be extracted from, e.g., a lithium metal composite oxide, and then a lithium precursor may be recovered at a high concentration by using a phosphorus-containing lithium extracting agent.

In some embodiments, lithium hydroxide may be used in a circulation of a neutralizing agent for nickel, manganese and cobalt. Accordingly, a high-concentration lithium precursor may be recovered while substantially removing sodium (Na)-containing impurities.

In some embodiments, a sulfuric acid solution may be recycled while converting a preliminary lithium precursor recovered as, e.g., lithium sulfate to lithium hydroxide by an electrodialysis. Thus, an amount of the sulfuric acid solution input throughout an entire process may be reduced to enhance a process yield and an eco-friendliness.

BRIEF DESCRIPTIONS OF THE DRAWINGS

DETAILED DESCRIPTION

Embodiments of the present invention provide a method for recovering precursors including lithium and a transition metal from, e.g., a cathode of a waste lithium secondary battery through a wet-based process.

Hereinafter, embodiments of the present invention will be described in detail with reference to the accompanying drawings. However, the embodiments are provided as examples and the present invention is not limited to the specific embodiments described herein.

As used herein, the term "precursor" is used to comprehensively refer to a compound including a specific metal to provide the specific metal included in an electrode active material.

Figure 1:
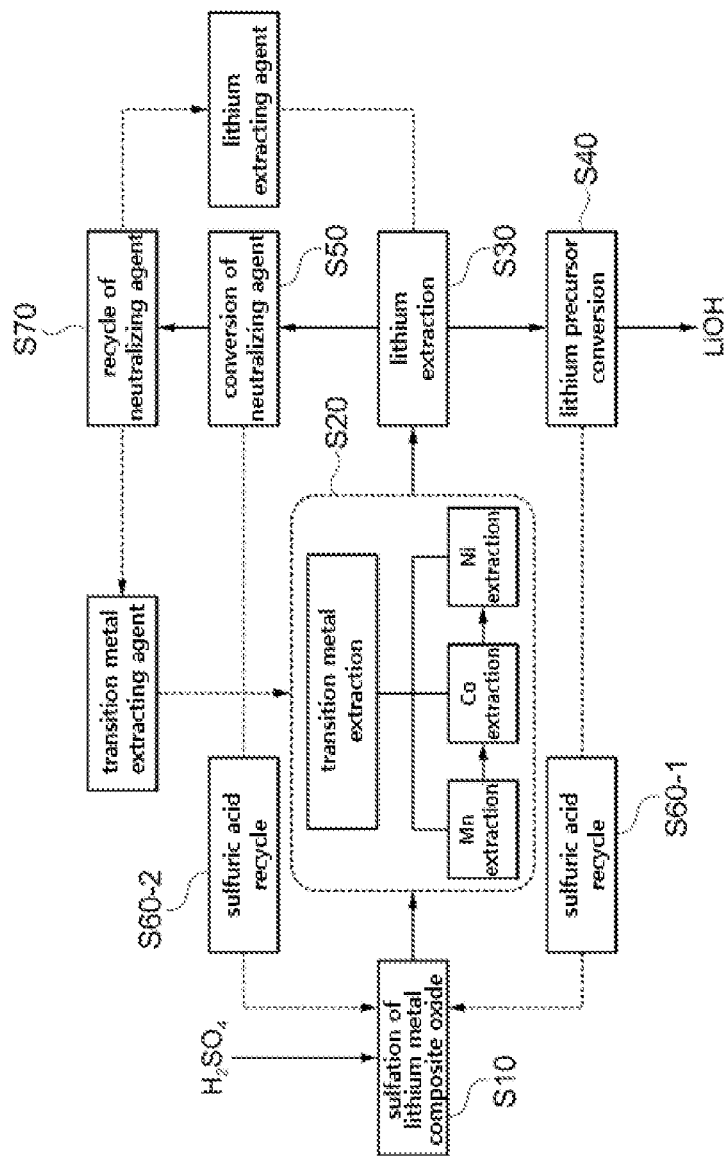
FIG. 1 is a schematic flow diagram illustrating a method for recovering an active metal of a lithium secondary battery according to exemplary embodiments.

FIG. 1 is a schematic flow diagram illustrating a method for recovering an active metal of a lithium secondary battery according to exemplary embodiments.

Referring to FIG. 1, a lithium metal composite oxide may be sulfated by adding sulfuric acid (e.g., S10 process).

In exemplary embodiments, the lithium metal composite oxide may be obtained from a waste lithium secondary battery or a cathode active material of a used lithium secondary battery.

The lithium secondary battery may include an electrode assembly including a cathode, an anode, and a separation layer interposed between the cathode and the anode. The cathode and the anode may include a cathode active material layer and an anode active material layer coated on a cathode current collector and an anode current collector, respectively.

For example, a cathode active material included in the cathode active material layer may include the lithium metal composite oxide containing lithium and a transition metal.

In some embodiments, the lithium metal composite oxide may include a compound represented by Formula 1 below.

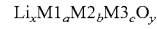   [Chemical Formula 1]

In Chemical Formula 1, M1, M2 and M3 may each be a transition metal selected from Ni, Co, Mn, Na, Mg, Ca, Ti, V, Cr, Cu, Zn, Ge, Sr, Ag, Ba, Zr, Nb, Mo, Al, Ga or B. In Chemical Formula 1, $0<x\leq1.1$, $2\leq y\leq2.02$, $0<a<1$, $0<b<1$, $0<c<1$, and $0<a+b+c\leq1$.

In some embodiments, the cathode active material may be an NCM-based lithium oxide including nickel (Ni), cobalt (Co) and manganese (Mn).

The waste cathode may be recovered by separating the cathode from the waste lithium secondary battery. The waste cathode may include the cathode current collector (e.g., aluminum (Al)) and the cathode active material layer as described above, and the cathode active material layer may include a conductive material and a binder together with the cathode active material as described above.

The conductive material may include, e.g., a carbon-based material such as graphite, carbon black, graphene and carbon nanotube. The binder may include a resin material, e.g., vinylidenefluoride-hexafluoropropylene copolymer (PVDF-co-HFP), polyvinylidenefluoride (PVDF), polyacrylonitrile, polymethylmethacrylate, etc.

In some embodiments, the recovered waste cathode may be pulverized to produce a waste cathode active material mixture. Accordingly, the waste cathode active material mixture may be prepared in a powder form. As described above, the waste cathode active material mixture may include a powder of the lithium metal composite oxide, e.g., a powder of the NCM-based lithium oxide (e.g., Li(NCM)$O_2$).

The waste cathode active material mixture may include portions of components derived from the binder or the conductive material. In an embodiment, the waste cathode active material mixture may substantially consist of the lithium metal composite oxide particles.

In some embodiments, the waste cathode active material mixture may be heat-treated before being subject to a solution reaction to be described later. Impurities such as the conductive material and the binder included in the waste cathode active material mixture may be substantially removed or reduced by the heat treatment, so that the lithium metal composite oxide may be introduced into the solution reaction with high purity.

A temperature of the heat treatment temperature may be, e.g., from about 100 to 500° C., preferably from about 350 to 450° C. Within the above range, the impurities may be substantially removed while preventing decomposition and damages of the lithium metal composite oxide.

Sulfuric acid may be added to the lithium metal composite oxide prepared as described above to perform a sulfation treatment. Accordingly, a sulfated active material solution may be prepared.

In some embodiments, the cathode may be separated from the waste lithium secondary battery, and then a sulfuric acid solution may be injected into the separated cathode. In this case, the lithium metal composite oxide may be dissolved in the sulfuric acid solution while the cathode material layer is separated from the cathode current collector.

In some embodiments, a pre-treatment for removing impurities present in the sulfated active material solution may be performed after adding sulfuric acid. For example, the impurities may include components of the current collector, the conductive material and/or the binder remaining in the above-described waste cathode active material mixture. The pre-treatment may include a precipitation using an alkali material, a filtration, a centrifugation, a washing, etc.

In some embodiments, hydrogen peroxide ($H_2O_2$) may be added together with the sulfuric acid solution. For example, hydrogen peroxide may serve as a reducing agent and may promote a transition metal extraction as described below.

For example, in a step S20, a transition metal may be extracted from the sulfated active material solution. As described above, the transition metal may include Ni, Co and Mn.

In exemplary embodiments, the transition metal may be extracted as a transition metal precursor (e.g., a transition metal sulfate form). For example, nickel sulfate ($NiSO_4$), cobalt sulfate ($CoSO_4$) and manganese sulfate ($MnSO_4$) may be produced and collected from Ni, Co and Mn, respectively.

In exemplary embodiments, the transition metal precursor may be collected by adding a transition metal extracting agent into the sulfated active material solution. The transition metal extracting agent may include a phosphoric acid-based compound, a phosphonic acid-based compound, a phosphinic acid-based compound or a carboxylic acid-based compound.

In some embodiments, the transition metal extraction may be performed while stepwise increasing a pH. For example, Mn, Co and Ni may be sequentially extracted while increasing the pH.

For example, manganese sulfate may be extracted as a manganese precursor after increasing the pH to a range from about 3.5 to 4.5 (e.g., about 4). Thereafter, the pH may be increased to a range from about 4.5 to 5.5 (e.g., about 5), and then cobalt sulfate may be extracted as a cobalt precursor. Thereafter, the pH may be increased to a range from about 6 to 7 (e.g., about pH 6.5), and then nickel sulfate may be extracted as a nickel precursor.

In some embodiments, a plurality of different transition metal extracting agents may be used in the transition metal extraction. In an embodiment, an alkyl phosphate-based compound may be used as the transition metal extracting agent for extracting Mn and Ni. For example, di-(2-ethylhexyl)phosphoric acid (D2EHPA) may be used as the alkyl phosphate-based compound.

In an embodiment, an alkyl phosphonic acid or alkyl phosphinic acid-based compound may be used as the transition metal extracting agent for the Co extraction. For example, 2-ethylhexyl 2-ethylhexyphosphonic acid (2-Ethylhexyl 2-ethylhexyphosphonic acid, commercial name: PC88A) or bis(2,2,4-trimethyl pentyl)phosphinic acid (commercial name: Cyanex-272) may be used as the alkyl phosphonic acid or alkyl phosphinic acid-based compound.

The transition metal extracting agent may be used in a saponified state. For example, in the case of the phosphoric acid, phosphinic acid or phosphonic acid-based extracting agent, a transition metal ion (e.g., $Mn^{2+}$, $Co^{2+}$, $Ni^{2+}$) may substitute a proton (H+) site to extract the transition metal.

In this case, as a H+ concentration in a reaction solution increases, the pH decreases and the above-described stepwise transition metal extraction may not be implemented. Thus, to prevent the pH drop, a pre-saponified transition metal extracting agent may be used to suppress the pH drop, and the selective extraction for each transition metal as described above may be performed with a gradual increase of the pH.

In an embodiment, the transition metal extraction as described above may be performed simultaneously or substantially in a single extraction process. In this case, Ni, Co and Mn may be extracted together by adding the transition metal extracting agent as described above.

For example, in a step S30, lithium may be extracted from a residual solution in which the transition metals are extracted as described above from the sulfated active material solution. In exemplary embodiments, lithium may be selectively extracted from the residual solution using a lithium extracting agent.

An alkyl phosphinic acid-based compound, an alkyl phosphonic acid-based compound or a carboxylic acid-based compound may be used as the lithium extracting agent. In an embodiment, a compound other than the transition metal extracting agents as described above may be used as the lithium extracting agent. In some embodiments, e.g., CYANEX936 (commercial name, manufacturer: Solvay) or Versatic 10 (commercial name, manufacturer: HEXION) may be used as the lithium extracting agent.

In an embodiment, the same compound as the transition metal extracting agent described above may be used as the lithium extracting agent.

The residual solution may include, e.g., an alkali metal ion (e.g., Na+) derived from the saponified transition metal extracting agent together with a lithium ion. The lithium extracting agent may have a selective reactivity to the lithium ion and may capture the lithium ion.

In an embodiment, the residual solution may not contain a divalent ion. As described above, substantially all of the transition metal ions may be extracted from the sulfated active material solution by the transition metal extracting agent. Additionally, a monovalent alkali metal hydroxide (e.g., NaOH) may be used as the neutralizing agent for the saponification of the transition metal extracting agent, and a hydroxide of a divalent metal such as $Mg^{2+}$ or $Ca^{2+}$ may not be used.

Accordingly, the residual solution may contain lithium and monovalent alkali metal ions, and lithium selectivity through the lithium extracting agent may be improved.

In some embodiments, the lithium extracting agent may be used in a saponified state to prevent a decrease of pH due to the lithium extraction.

As the lithium ion may be selectively extracted from the sulfuric acid-based residual solution, a preliminary lithium precursor in the form of lithium sulfate may be collected. In exemplary embodiments, the preliminary lithium precursor may be converted into a lithium precursor for re-synthesizing the lithium metal composite oxide as a cathode active material (e.g., process S40).

In some embodiments, the lithium precursor conversion may be performed by an electrodialysis (e.g., a first electrodialysis). The first electrodialysis may be performed using a bipolar electrodialysis apparatus including a negative electrode and a positive electrode facing each other with an ion exchange membrane interposed therebetween.

For example, lithium ions (e.g., moving to the negative electrode) and sulfate ions (e.g., moving to the positive electrode) may be separated and transferred by the ion exchange membrane through a hydrolysis in the bipolar electrodialysis apparatus based on a reaction of Equation 1 below to generate lithium hydroxide. Lithium hydroxide may be collected as the lithium precursor.

$$Li_2SO_4 + 2H_2O \rightarrow 2LiOH + H_2SO_4 \quad \text{[Equation 1]}$$

Lithium may be selectively extracted from the residual solution, so that the alkali metal ion (e.g., sodium ion (Na+)) derived from the neutralizing agent may remain in the residual solution. For example, the alkali metal ion may remain in the form of sodium sulfate ($Na_2SO_4$).

In some embodiments, the alkali metal sulfate may be converted to a neutralizing agent (e.g., process S50). For example, the alkali metal sulfate may be converted into an alkali metal hydroxide (e.g., NaOH) using an electrodialysis (e.g., a second electrodialysis) according to substantially the same concept as the lithium precursor conversion process as described above.

The active metal recovery method according to exemplary embodiments may further include a sulfuric acid recycling process (e.g., S60-1 and S60-2 processes).

In some embodiments, lithium hydroxide may be collected as the lithium precursor from lithium sulfate through the first electrodialysis as described above, and sulfuric acid may be generated by reacting separated sulfate ions with water. Sulfuric acid generated from the first electrodialysis may be recirculated or recycled to the lithium metal composite oxide sulfation process (S10) (e.g., process S60-1).

In some embodiments, the neutralizing agent may be regenerated from the alkali metal sulfate such as sodium sulfate through the second electrodialysis as described above, and the separated sulfate ions may react with water to generate sulfuric acid. Sulfuric acid generated from the second electrodialysis may be recirculated or recycled to the lithium metal composite oxide sulfation process (S10) (e.g., process S60-2).

In an embodiment, sulfuric acid generated from the first and second electrodialysis may be recycled to the transition metal extraction process (S20 process).

The active metal recovery method according to exemplary embodiments may further include a neutralizing agent recycling process (e.g., S70 process).

For example, the neutralizing agent such as NaOH may be collected through the second electrodialysis. The neutralizing agent may be recycled for saponification of the transition metal extracting agent and/or the lithium extracting agent. A transition metal extraction process and a lithium extraction process may be performed using the saponified transition metal extracting agent and the lithium extracting agent, respectively.

According to the above exemplary embodiments, the lithium ions may be concentrated at a high concentration using the lithium extracting agent. Additionally, the lithium ions concentrated using the electrodialysis may be directly converted into the lithium precursor in the form of lithium hydroxide without additional agents or additional reactants. Therefore, lithium recovery yield may be increased and an amount of Na-derived impurities may be reduced.

Additionally, input amounts of sulfuric acid and the neutralizing agent may be reduced through the recycling process of sulfuric acid and neutralizing agent, so that process efficiency may be improved, and environmental pollution may be remarkably reduced.

Figure 2:
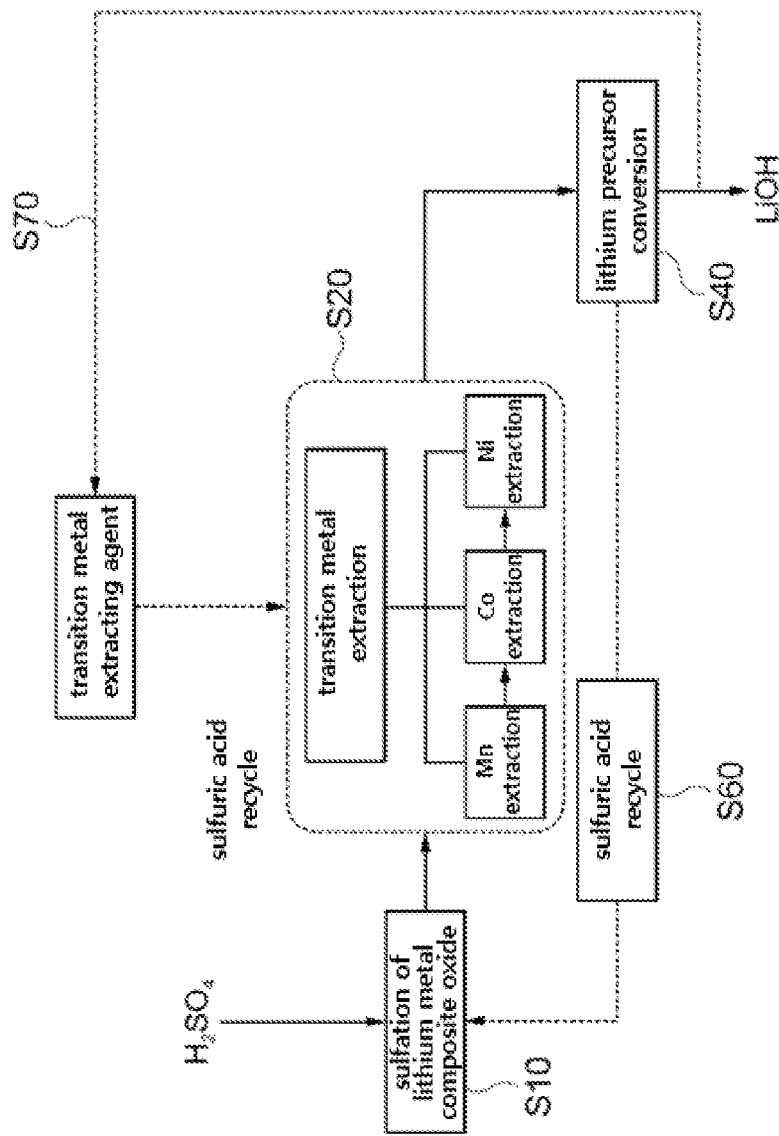
FIG. 2 is a schematic flow diagram illustrating a method for recovering an active metal of a lithium secondary battery according to exemplary embodiments.

FIG. 2 is a schematic flow diagram illustrating a method for recovering an active metal of a lithium secondary battery according to exemplary embodiments. The same or similar reference numerals are used to designate processes or steps substantially the same as or similar to those described with reference to FIG. 1.

Referring to FIG. 2, as described above, the lithium precursor conversion may be performed directly for the residual solution obtained by extracting the transition metals from the sulfated active material solution (e.g., in a step S40).

As described above, the lithium precursor conversion may be performed through the electrodialysis. Using the electrodialysis, lithium ions dissolved in the residual solution in the form of lithium sulfate may be converted and collected into the lithium precursor in the form of lithium hydroxide.

In exemplary embodiments, the residual solution includes lithium sulfate, and may not include an ion (e.g., Na+) or an ion compound (e.g., $Na_2SO_4$) of an alkali metal except for lithium. Accordingly, the lithium extracting agent used in the embodiment of FIG. 1 may not be used, and lithium hydroxide may be converted/collected directly by the electrodialysis.

In some embodiments, a portion of converted lithium hydroxide may be recycled as a neutralizing agent and used for saponification of the transition metal extracting agent (e.g., a process S70). Thus, the use of a separate neutralizing agent such as NaOH may be omitted, and sodium ions in the residual solution may not be substantially included as described above.

Therefore, the use of the lithium extracting agent for a sodium ion separation and the process of converting the neutralizing agent may be omitted, and the lithium precursor may be collected with a high concentration. Accordingly, a portion of the collected lithium precursor may be circulated as the neutralizing agent for saponification of the transition metal extractant.

Figure 3:
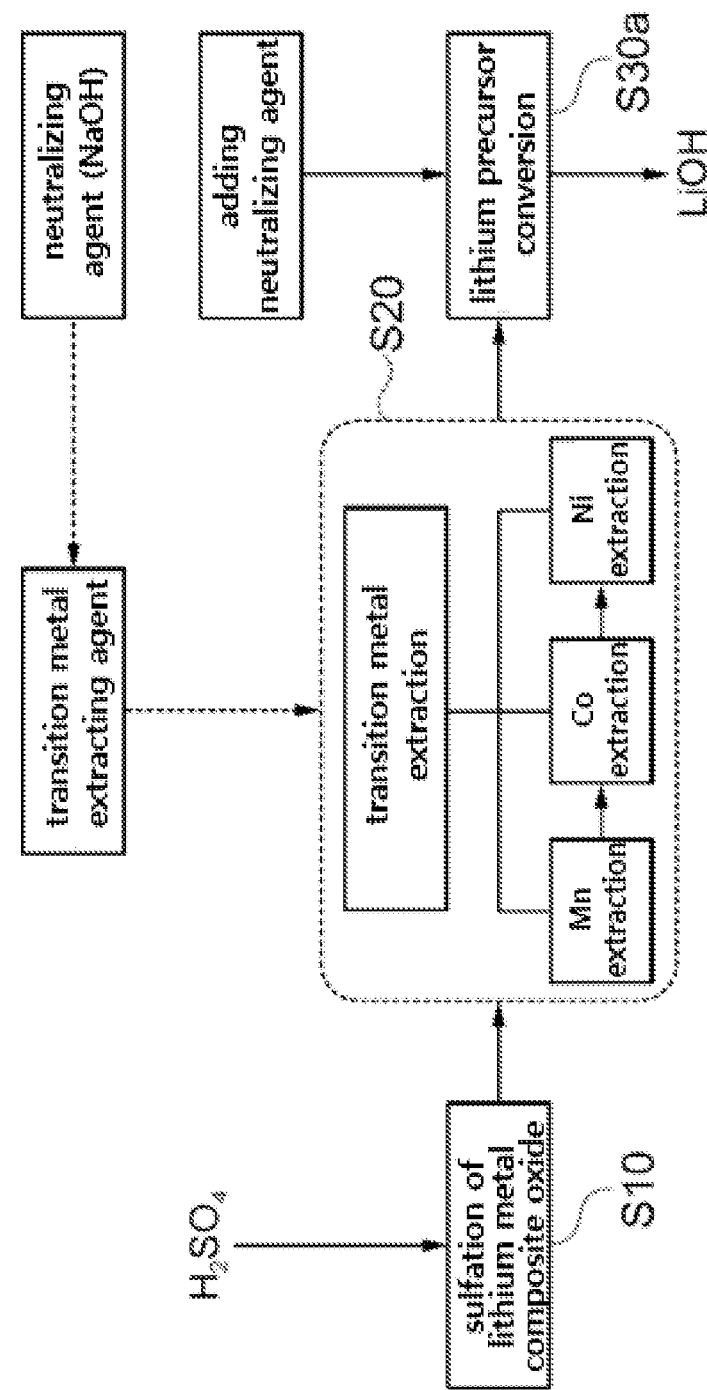
FIG. 3 is a schematic flow diagram illustrating a method for recovering an active metal of a lithium secondary battery according to a comparative example.

FIG. 3 is a schematic flow diagram illustrating a method for recovering an active metal of a lithium secondary battery according to a comparative example.

Referring to FIG. 3, in a comparative example, the lithium metal composite oxide may be sulfated (e.g., S10 process), and then the transition metals may be extracted/recovered in the form of sulfates using the transition metal extracting agent as described in the above-described embodiments.

The transition metal extractant are used after being saponified using a neutralizing agent such as NaOH. In this case, $Na_2SO_4$ and $Li_2SO_4$ may be mixed and included in the residual solution from which the transition metals are extracted.

In the comparative example, a precipitating agent is used to recover a lithium precursor in the form of LiOH from the residual solution (e.g., process S30a). For example, $Li_2SO_4$ may be converted into lithium carbonate ($Li_2CO_3$) by adding $Na_2CO_3$ as a first precipitating agent. Thereafter, e.g., calcium hydroxide ($Ca(OH)_2$) may be added as a second precipitating agent to convert lithium carbonate into lithium hydroxide.

According to the above-described comparative example, a Na ion or a Na ion compounds derived from the saponified transition metal extracting agent and the precipitating agent remain as impurities, and thus purity and yield of the lithium precursor may be reduced. For example, the Na ion or the Na ion compounds are generated by twice an equivalent amount of the transition metal extracting agent used in the transition metal extraction process, and the Na ion or the Na ion compound by an equivalent amount of the Li ion is additionally generated by $Na_2CO_3$ used as the precipitating agent. As a result, the amount of Na may be increased to be greater than the amount of lithium in the residual solution.

However, according to the above-described exemplary embodiments, Na impurities derived from the precipitating agent may be reduced by using the lithium extracting agent instead of the precipitating agent. Additionally, the Na impurities (e.g., $Na_2SO_4$) may be converted to NaOH through the second electrodialysis and then recycled to the saponification of the transition metal extracting agent. Therefore, an amount of the Na impurities generated throughout the entire process may be reduced.

As described with reference to FIG. 2, LiOH may be used as the neutralizing agent for saponification of the transition metal extracting agent. In this case, the Na impurity may be substantially removed, and a lithium concentrating may be directly performed from the remaining solution from which the transition metals are extracted. Thus, the yield and purity of lithium may be further improved.

Additionally, in the above-described embodiments, sulfuric acid may be entirely recycled and used, and eco-friendliness and productivity of the process may be further improved.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

Residual solution (Li 5.9 g/L, Na 47.6 g/L, pH 6.45) after sequentially extracting Mn/Ni/Co with a phosphoric acid-based extracting agent saponified with NaOH using $LiNi_{0.6}Co_{0.2}Mn_{0.2}O_2$ as a cathode active material was prepared (an aqueous solution). Li was extracted/concentrated from the remaining solution using PC88A 0.8M or Cyanex272 0.8M (saponified with 50% NaOH, saponification degree: 30%) solution (an organic phase solution) as a lithium extracting agent.

A volume ratio of the organic phase solution to the aqueous phase solution was maintained as 3.

Concentrations of Li and Na contained in the aqueous phase solution before extraction and the organic phase solution after extraction are as shown in Table 1 below.

TABLE 1

| | extracting agent | | | |
|---|---|---|---|---|
| | PC88A | | Cyanex272 | |
| g/L | Li | Na | Li | Na |
| aqueous phase before extraction | 5.9 | 47.6 | 5.9 | 47.6 |

TABLE 1-continued

| | extracting agent | | | |
|---|---|---|---|---|
| | PC88A | | Cyanex272 | |
| g/L | Li | Na | Li | Na |
| organic phase after extraction | 1.0 | 2.0 | 0.9 | 2.5 |

The organic phase solution after extraction was subjected to a Li stripping (concentrating) with a 2M sulfuric acid solution (aqueous solution). A volume ratio of the organic phase solution after extraction to the aqueous phase solution was maintained as 15.

Concentrations of Li and Na measured after the Li stripping are shown in Table 2 below.

TABLE 2

| | extracting agent | | | |
|---|---|---|---|---|
| | PC88A | | Cyanex272 | |
| g/L | Li | Na | Li | Na |
| organic phase before stripping (organic phase after extraction) | 1.0 | 2.0 | 0.9 | 2.5 |
| after stripping | 14.5 | 30.3 | 13.4 | 38.5 |

Referring to Tables 1 and 2, it was confirmed that a selectivity of Li (Li/Na) was explicitly increased after stripping compared to that in the aqueous solution before extraction. It is be predicted the Li selectivity can be further improved when a continuously repeated process including a recycle process is performed.

Example 2

Ni/Co/Mn co-extraction was performed from a sulfuric acid leachate (an aqueous phase solution before extraction) of $LiNi_{0.6}Co_{0.2}Mn_{0.2}O_2$ as a cathode active material using Versatic 10 0.8M saponified solution (an organic phase solution) with 10% LiOH as an extracting agent (60% saponified).

A volume ratio of the organic phase solution to the aqueous phase solution was maintained as 3.

Metal concentrations contained in the aqueous solution before extraction and the solution after extraction are as shown in Table 3 below.

TABLE 3

| g/L | Mn | Co | Ni | Li | Na |
|---|---|---|---|---|---|
| before extraction | 20.5 | 21.8 | 64.3 | 13.6 | 0.1 |
| after extraction | 0.5 | 0.1 | 0.5 | 24.6 | <0.1 |

Referring to Table 3, the concentration of Li to the aqueous phase solution was explicitly increased after the extractions, and the purity and recovery of Li increased as Ni, Co, and Mn were extracted. Further, it is predicted the Li selectivity can be further improved when a continuously repeated process including a recycle process is performed.

Comparative Example

Ni/Co/Mn co-extraction was performed using $LiNi_{0.6}Co_{0.2}Mn_{0.2}O_2$ as a cathode active material with a phosphoric acid-based extracting agent saponified by NaOH, and then Li was collected from a residual solution by evaporation concentrating.

Concentrations of Li and Na after the evaporation concentrating are as shown in Table 4 below.

TABLE 4

| water removal ratio | 0% (residual solution) | 50% | 75% | 80% |
|---|---|---|---|---|
| Li, g/L | 2.9 | 6.1 | 6.9 | 4.1 |
| Na, g/L | 43 | 89 | 115 | 128 |
| Li recovery, % | — | 100 | 59 | 28 |

Referring to Table 4, as the water removal ratio increased while the evaporation concentrating proceeded, Li was co-precipitated with Na and the Li recovery was decreased.

What is claimed is:

1. A method for recovering an active metal of a lithium secondary battery, the method comprising:
    adding sulfuric acid to a lithium metal composite oxide to prepare a sulfated active material solution;
    extracting a transition metal from the sulfated active material solution, wherein the extracting of the transition metal comprises adding a transition metal extracting agent; and
    adding a lithium extracting agent to a residual solution in which the transition metal is extracted from the sulfated active material solution to recover a lithium precursor, wherein an alkali metal sulfate and lithium sulfate are generated from the residual solution by adding the lithium extracting agent;
    converting the alkali metal sulfate generated from the residual solution into a converted sulfuric acid solution and a converted alkali metal hydroxide; and
    recycling the converted alkali metal hydroxide to a saponification of the transition metal extracting agent and the lithium extracting agent,
    wherein the transition metal extracting agent and the lithium extracting agent are added in a saponified state by the converted alkali metal hydroxide.

2. The method according to claim 1, wherein the transition metal extracting agent includes an alkyl phosphate-based compound, an alkyl phosphonic acid-based compound, an alkyl phosphinic acid-based compound or a carboxylic acid-based compound.

3. The method according to claim 2, wherein the lithium metal composite oxide contains nickel, cobalt and manganese; and
    the extracting the transition metal comprises sequentially increasing a pH of the sulfated active material solution and sequentially extracting manganese, cobalt and nickel.

4. The method of claim 2, wherein the lithium metal composite oxide contains nickel, cobalt, and manganese; and
    the extracting the transition metal comprises simultaneously extracting nickel, cobalt, and manganese.

5. The method of claim 2, wherein the lithium extracting agent includes an alkyl phosphinic acid-based compound, an alkyl phosphonic acid-based compound or a carboxylic acid-based compound.

6. The method of claim 1, further comprising recycling the converted sulfuric acid solution to preparing the sulfated active material solution or extracting the transition metal from the sulfated active material solution.

7. The method of claim 1, wherein converting the alkali metal sulfate generated from the residual solution into the converted sulfuric acid solution and the converted alkali metal hydroxide comprises an electrodialysis.

8. The method according to claim 1, wherein the lithium extracting agent is added to the residual solution to generate lithium sulfate; and
    the recovering the lithium precursor comprises converting the generated lithium sulfate into lithium hydroxide by an electrodialysis.

9. The method of claim 8, wherein a second sulfuric acid solution is generated together with lithium hydroxide by the electrodialysis.

10. The method of claim 9, further comprising recycling the second sulfuric acid solution to preparing the sulfated active material solution or extracting the transition metal from the sulfated active material solution.

11. A method for recovering an active metal of a lithium secondary battery, comprising:
    adding sulfuric acid to a lithium metal composite oxide to prepare a sulfated active material solution;
    extracting a transition metal from the sulfated active material solution wherein the extracting of the transition metal comprises adding a transition metal extracting agent;
    recovering lithium hydroxide directly from a residual solution from which the transition metal is extracted from the sulfated active material solution by an electrodialysis; and
    recycling a portion of the recovered lithium hydroxide for a saponification of the transition metal extracting agent.

12. The method of claim 11, wherein the recovering lithium hydroxide comprises converting lithium sulfate contained in the residual solution into lithium hydroxide by the electrodialysis.

13. The method according to claim 12, further comprising recycling a sulfuric acid solution to preparing the sulfated active material solution or extracting the transition metal from the sulfated active material solution; and
    the sulfuric acid solution is generated from lithium sulfate by the electrodialysis.

14. The method of claim 11, wherein the transition metal extracting agent includes an alkyl phosphate-based compound, an alkyl phosphonic acid-based compound, an alkyl phosphinic acid-based compound or a carboxylic acid-based compound.

15. The method of claim 14, wherein the lithium metal composite oxide contains nickel, cobalt and manganese; and
    the extracting the transition metal comprises sequentially increasing a pH of the sulfated active material solution and sequentially extracting manganese, cobalt and nickel.

16. The method of claim 14, wherein the lithium metal composite oxide contains nickel, cobalt, and manganese; and
    the extracting the transition metal comprises simultaneously extracting nickel, cobalt, and manganese.

* * * * *